No. 12,414. REISSUED DEC. 5, 1905.

W. A. DERBY.

DUST COLLECTOR.

APPLICATION FILED JULY 12, 1905.

Witnesses:

Chas. E. Gaylord,

John Enders.

Inventor:

William A. Derby,

By Dyrenforth, Dyrenforth & Lee,

Attys.

UNITED STATES PATENT OFFICE.

WILLIAM A. DERBY, OF AURORA, ILLINOIS

DUST-COLLECTOR.

No. 12,414. Specification of Reissued Letters Patent. Reissued Dec. 5, 1905.

Original No. 735 954, dated August 11, 1903. Application for reissue filed July 12, 1905. Serial No. 269,461.

*To all whom it may concern:*

Be it known that I, WILLIAM A. DERBY, a citizen of the United States, residing at Aurora, in the county of Kane and State of Illinois, have invented a new and useful Improvement in Dust-Collectors, of which the following is a specification.

My invention relates to improvements in devices for use in connection with air-fluid-conducting pipes for precipitating and collecting particles of dust or the like of greater specific gravity than the air and which may be carried by the air-currents through the pipes.

My object is to provide such a dust-collector or trap device of a simple and inexpensive construction and particularly effective for its purpose.

The invention is well adapted for air-brake and signal pipes on cars, and for this reason I show and describe my improved dust-collector in connection with an air-brake system.

Figure 1:
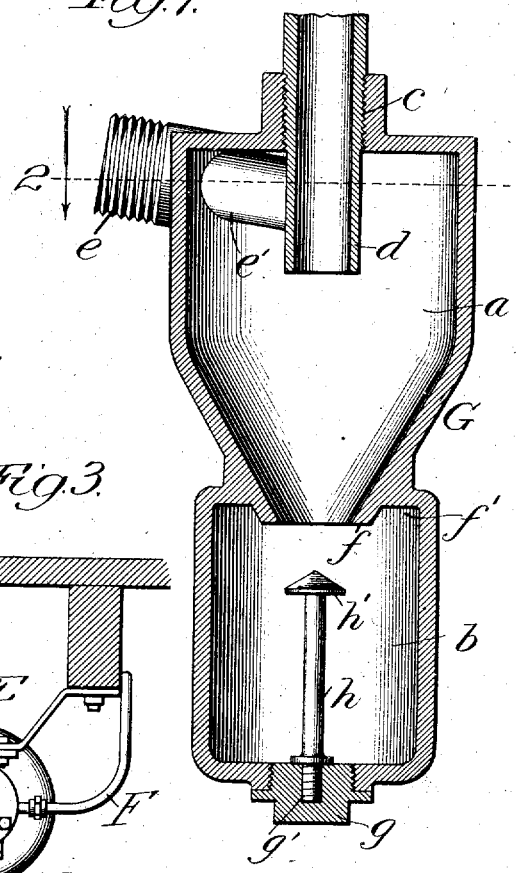
Figure 2:
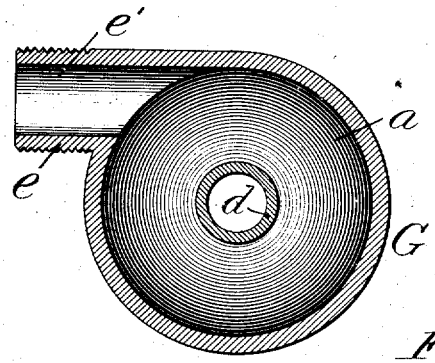
Figure 3:
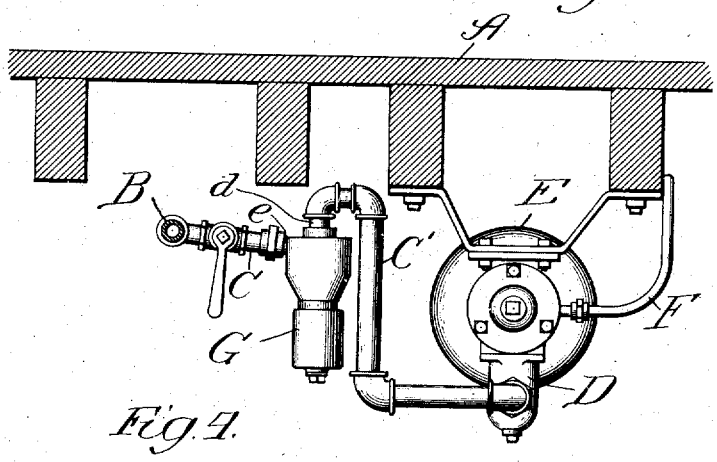
Figure 4:
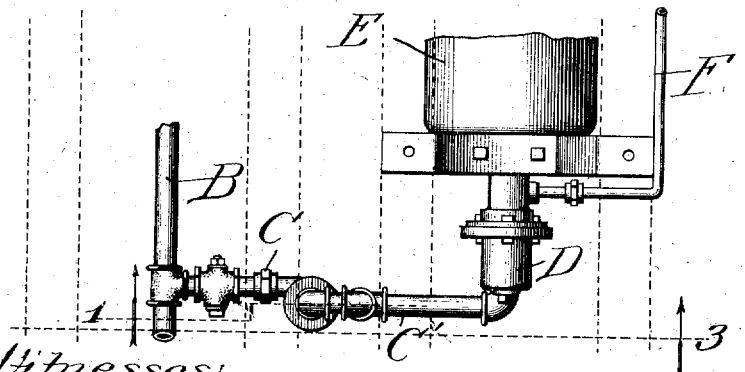

Referring to the drawings, Figure 1 is a vertical section of my improved dust-trap as I prefer to construct it, the section being taken on line 1 of Fig. 4 and enlarged; Fig. 2, a plan section on line 2 of Fig. 1; Fig. 3, a broken sectional view on line 3 of Fig. 4 of the underframe of a railway-car, showing air-brake devices, including my improvement, in elevation; and Fig 4, a broken top plan view of the said devices.

A is the underframe of a car; B, a main train-pipe or brake-pipe; C C′, sections, respectively, of a branch brake-pipe; D, a triple valve; E, a brake-cylinder, and F an auxiliary reservoir-pipe.

As the parts referred to are standard and their functions well known, no detailed description thereof is thought necessary in this connection.

G is my improved dust-collector. It comprises a casing presenting an upper funnel-form separating or precipitating chamber *a* and a lower cylindrical collecting-chamber *b*. At the center of the top of the casing is a threaded opening *c* to receive the threaded vertical end portion *d* of the branch pipe-section C′, which extends downward into the chamber *a*, as shown. On the shell at one side is a hollow threaded coupling-boss *e*, forming a port or inlet-passage *e′*, which extends to the chamber *a* in a slightly-downward-inclined direction in a plane above the lower end of and to one side of the outlet-pipe *d*. The mouth or lower end portion *f* of the funnel-form chamber *a* projects downward into the upper end of the chamber *b*, leaving an annular recess *f′* in the top wall of the chamber *b*. In the lower end of the chamber *b* is a central threaded clean-out opening fitted with a removable cover or screw-plug *g*. This screw-plug has a central threaded socket *g′* in its upper face to receive the threaded lower end portion of a vertical stem *h*, carrying a conical head or guard *h′*. The casing is coupled at its boss *e* to the branch pipe-section C, and thus held by the branch pipes interposed in the passage from the brake-pipe to the triple valve.

Air passing from the brake-pipe to the triple valve enters the separating-chamber *a* in a comparatively narrow stream, the direction of the stream or current being slightly downwardly inclined and to one side of the outlet-pipe *d*, whereby the air discharges into the chamber past said pipe. Thus the stream or current tends on entering the chamber *a* to pursue a spiral course to a plane at least somewhat below the mouth of the outlet-pipe *d*. The constant change of angle of the stream of air causes any particles of dust carried with the air to strike against the circular wall of the chamber *a* and be deflected thereby in the downward direction. The entire body of air in the chamber *a* will of course be in motion during the passage of the direct current from the inlet *e′* to the outlet *d*; but the large capacity of the chamber as compared with the area of the inlet and outlet ports causes the velocity of the current to be greatly diminished while passing through the chamber, and the movement of the air will be with decreasing force toward the lower end of said chamber. Thus the particles of dust deflected downward, as described, move farther and farther away from the direct influence of the main air-current and descend by gravity until they fall into the collecting-chamber *b*. In falling into the collecting-chamber, the particles dropping against the conical face of the guard *h′* roll off of the latter and drop toward the base of the collecting-chamber.

In practice on account of the constant starting and stopping of the flow of air through the pipes, or for other reasons, more or less violent agitation of the air in the chamber *b* is apt to take place. The guard *h′* is an important feature of my improvements, because it prevents such agitation from raising the dust deposited in the chamber *b* and causing it to escape again into the chamber *a* and to the outlet *d*. Owing to the presence of the guard *h'*, which is preferably constructed as shown and described, any whirl or current of air passing downward into the chamber *b* must in passing upward again be deflected by the guard, whereby any particles of dust carried by the current will strike against the shoulder formed by the under side of the guard or against the top of the chamber *b* in the recess *f'*. Any particles of dust that once fall into the chamber *b* will thus be prevented from escaping upward through the outlet *f*. The screw-plug *g* may be readily removed to permit cleaning out of the trap or collecting-chamber *b*.

What I claim as new, and desire to secure by Letters Patent, is—

1. In a dust-collector a casing provided with an upper separating-chamber and a lower collecting-chamber with a contracted free opening between them, an air-outlet pipe extending from the upper part of the separating-chamber, a tangential air-inlet in the separating-chamber, a guard-head for said opening, and a support for said head mounted in the collecting-chamber, the guard-head and its support being out of contact with the sides of the separating-chamber and said opening.

2. In a dust-collector a casing provided with an upper separating-chamber and a lower collecting-chamber with a contracted free opening between them, an air-outlet pipe extending from the upper part of the separating-chamber, a tangential air-inlet in the separating-chamber, and a guard device in the upper part of the collecting-chamber below the said opening.

3. In a dust-collector a casing provided with an upper separating-chamber, a lower collecting-chamber, an abruptly-contracted free opening connecting the chambers, an air-outlet pipe depending into the upper portion of the separating-chamber, a tangential air-inlet in the upper part of the casing discharging air into the separating-chamber above the outlet-pipe, and a guard device in the upper part of the collecting-chamber below the opening connecting the chambers.

4. In a dust-collector a casing provided with an upper separating-chamber, a lower collecting-chamber, an abruptly-contracted free opening connecting the chambers, an air-outlet pipe depending into the upper portion of the separating-chamber, a tangential air-inlet in the upper part of the casing discharging air into the separating-chamber above the outlet-pipe, a guard device in the upper part of the collecting-chamber below the opening connecting the chambers, and a clean-out opening in the collecting-chamber with means for closing the same.

5. In a dust-collector, a casing provided with an upper funnel-form separating-chamber communicating by an unimpeded opening with a lower cylindrical collecting-chamber of greater diameter than the lower open end of the separating-chamber, an air-outlet pipe extending downward in said casing and terminating short of the lower part of said separating-chamber, an air-inlet provided in the upper part of the casing above the lower end of said outlet-pipe to discharge air into the separating-chamber past the said outlet-pipe, a clean-out opening in the lower end of the collecting-chamber, a removable plug for the clean-out opening, a vertically-disposed stem upon the plug and a head above the stem in the upper part of the collecting-chamber below said opening forming a guard, substantially as and for the purpose set forth.

6. In an air-brake system, the combination with a pipe extending from the train-pipe to the triple valve, of a dust-collector comprising a casing provided with an upper separating-chamber, a lower collecting-chamber and an abruptly-contracted free opening between the chambers, an air-outlet pipe communicating with the triple valve and extending downward in said casing and terminating short of the lower part of said separating-chamber; an air-inlet pipe extending from the train-pipe to the upper part of said casing at one side above the lower end of said outlet-pipe, to discharge air into the separating-chamber past the said outlet-pipe, and a guard device in the upper part of the collecting-chamber, substantially as and for the purpose set forth.

WILLIAM A. DERBY.

In presence of—
E. P. ROWLANDS,
A. B. NICKOLSON